United States Patent [19]

Funahashi et al.

[11] Patent Number: 5,691,915
[45] Date of Patent: Nov. 25, 1997

[54] DATA TRANSMISSION DEVICE

[75] Inventors: Yasuhiro Funahashi; Kazunori Ikami, both of Nagoya; Yukie Hasegawa, Kasugai, all of Japan

[73] Assignees: Brother Kogyo Kabushiki Kaisha; Xing, Inc., both of Nagoya, Japan

[21] Appl. No.: 402,377

[22] Filed: Mar. 13, 1995

[30] Foreign Application Priority Data

Mar. 14, 1994 [JP] Japan .................. 6-042585

[51] Int. Cl.$^6$ ..................................... H04Q 1/00
[52] U.S. Cl. .................. 364/514 A; 348/10; 379/101; 455/6.3
[58] Field of Search .................. 364/514 A, 514 C; 348/7, 10, 13; 379/101; 455/4.2, 6.3

[56] References Cited

U.S. PATENT DOCUMENTS

| 4,789,863 | 12/1988 | Bush | 340/825.35 |
|---|---|---|---|
| 5,003,384 | 3/1991 | Durden et al. | 358/84 |
| 5,282,028 | 1/1994 | Johnson et al. | 358/86 |
| 5,464,946 | 11/1995 | Lewis | 84/609 |
| 5,530,754 | 6/1996 | Garfinkle | 380/5 |
| 5,544,354 | 8/1996 | May et al. | 395/600 |

FOREIGN PATENT DOCUMENTS

| 396 062 | 7/1990 | European Pat. Off. . |
|---|---|---|
| 595 354 | 4/1994 | European Pat. Off. . |
| 176747 | 1/1992 | Taiwan . |
| 95/01059 | 1/1995 | WIPO . |

*Primary Examiner*—James P. Trammell
*Assistant Examiner*—Patrick J. Assouad
*Attorney, Agent, or Firm*—Oliff & Berridge

[57] ABSTRACT

When the terminal 5 requests a partial access of a desired karaoke song to the center 3 in S380, only the climactic passage data of the karaoke song is transmitted from the center 3 to the terminal 5. The terminal 5 reproduces the climactic passage in S400. Then, the terminal 5 determines whether or not the user will pay for the karaoke song in S410. When the payment is confirmed, the terminal 5 requests total access to the center 3 in S340, receives the entire data of the karaoke song in S350, and reproduces the data in S360. It is possible to prevent the user from erroneously requesting a total access of a karaoke song which the user does not want to sing. It is ensured that the user can obtain karaoke songs which he/she really wants to sing, within a short period of time.

15 Claims, 7 Drawing Sheets and total access request signals; reproducing means for reproducing the received partial data or the received entire data of the information data unit so that the user can verify the content of the received information data unit.

DATA TRANSMISSION DEVICE

BACKGROUND OF THE INVENTION

1. Field of the Invention

The present invention relates to a data transmission device wherein a central control unit and a plurality of terminals are connected by a transmission line, the data transmission device being for transmitting information data from the central control unit to the terminals.

2. Description of the Related Art

Conventionally, there is known a data transmission device, wherein a center (central control unit) is connected to a plurality of terminals by a transmission line. The data transmission device is for transmitting information data including various types of information to a terminal from a center according to demands from the terminal side. An advantage of this type of data transmission device is that a memory device for prestoring data information need not be provided to each terminal, so that the terminals have an extremely simple construction.

SUMMARY OF THE INVENTION

This data transmission device can be applied to a karaoke system for distributing karaoke song data to a plurality of terminals and to a movie distributing system for distributing movie data to a plurality of terminals.

Generally, there will be no way of knowing at an early stage whether or not the information data is what the user hopes for, unless of course the user knows the content of the selected information data beforehand. If a user selects information data without knowing its content, the user may be disappointed by information data with content that is different from what the user has expected. For example, if the information data is for a movie, the viewer may not be able to determine if the movie is what he or she has wanted to watch until viewing the movie part midway through or to the end.

This is especially a problem when the information data must be paid for, where misjudging the content of information data can result in a financial loss.

These problems can arise when the information data is selected by only referring to the title of the information data, for example, the title of a movie or the name of a karaoke song, when unable to view the content of the information data. To help relieve this problem, pay channels such as cable television offer a service where a viewer can view the program free of charge for a short period of time. When a viewer turns to the pay channel, after the program is shown free of charge for a short period of time, an announcement will appear on the television screen saying that the selected channel is a toll channel and that in order to view the channel any further the user must agree to pay by, for example, pressing a pay button on the television. If the viewer presses the button, he or she will be able to view the channel by paying for the pleasure.

However with this method also, a viewer is only able to see a short portion of the information data (for example, only the start of a movie or the portion of the movie that happens to be playing when the customer turns to the pay channel). It is often difficult for a customer to determine whether the information data is what he or she wants from knowing only a small bit of the entire information data.

It is an objective of the present invention to overcome the above-described problems and provide a data transmission device allowing a user to select information data, that includes image information, sound information, or both, with content closer to what the user desires when obtaining information data from a central control device using a terminal. The present invention thereby prevents the need to again select information data because of incorrect selections.

In order to attain the above objective and other objectives, the present invention provides a data transmission device for transmitting a desired information via a transmission line from a central control unit to a plurality of terminals, the data transmission device comprising: a central control unit including data memory means for storing information data, including image information, sound information, or both, in separate plural data units and in separate plural partial access data, at least a part of each partial access data being the same as a part of a corresponding data unit so as to indicate the content of the information data of the corresponding data unit; and a plurality of terminals connected to the central control unit via a transmission line so that the information data can be transmitted from the central control unit to the plurality of terminals, each of the plurality of terminals including: data selection means for selecting a desired information data of at least one data unit out of the information data stored in the memory means in the central control unit; partial access request means for requesting partial access of the information data selected by the data selection means; total access request means for requesting total access of the information data selected by the data selection means; and output means for, based on the information data transmitted from the central control unit, reproducing and outputting image information, sound information, or both from the partial access data in response to the partial access request performed by the partial access request means and from the entire part of the data unit in response to the total access request performed by the total access request means.

According to another aspect, the present invention provides a data transmission device for transmitting information via a transmission line from a central control unit to a plurality of terminals, the data transmission device comprising: a central control unit; and a plurality of terminals connected to the central control unit via a transmission line, wherein the central control unit includes data memory means for storing a plurality of information data units representative of a plurality of informations, each of the information data units having a partial data representing a predetermined part of the corresponding information which indicates the content of the information, wherein each of the plurality of terminals includes: data selection means for selecting at least one information data unit representative of an information desired to be obtained, out of the plurality of information data units stored in the data memory means in the central control unit; access type input means for inputting a desired access type out of a partial access for requesting transmission of the partial data out of the information data unit selected by the data selection means and a total access for requesting transmission of the entire data of the information data unit selected by the data selection means; access request means for transmitting to the central control unit a partial access request signal requesting transmission of the partial data of the selected information data unit when the partial access is inputted by the access type input means and for transmitting to the central control unit a total access request signal requesting transmission of the entire data of the selected information data unit when the total access is inputted by the access type input means; and information output means for receiving the partial data transmitted from the central control unit in response to the partial access request signal and outputting the part of the desired information, and for receiving the entire data unit transmitted from the central control unit in response to the total access request signal and outputting the entire part of the desired information.

According to a further aspect, the present invention provides a data transmission device for transmitting information via a transmission line from a central control unit to a plurality of terminals, the data transmission device comprising: a central control unit; and a plurality of terminals connected to the central control unit via a transmission line, wherein the central control unit includes data memory means for storing a plurality of information data units representative of a plurality of informations, each of the information data units having a partial data representing a predetermined part of the corresponding information which indicates the content of the information, wherein each of the plurality of terminals includes: data selection means for selecting at least one information data unit representative of an information desired to be obtained, out of the plurality of information data units stored in the data memory means in the central control unit; request means for transmitting to the central control unit a request signal requesting transmission of an entire data of the selected information data unit from the central control unit when the data selecting means selects the information data unit; temporary memory means for temporarily storing the entire data of the selected information data unit transmitted from the central control unit; access type input means for inputting a desired access type out of a partial access for requesting output of the partial data out of the selected information data unit and a total access for requesting output of the entire data of the selected information data unit; and information output means for extracting the partial data from the data unit stored in the temporary memory means, in response to the partial access inputted by the access type input means, and outputting the part of the desired information, and for extracting the entire data of the data unit stored in the temporary memory means, in response to the total access inputted by the access type input means, and outputting the entire part of the desired information.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
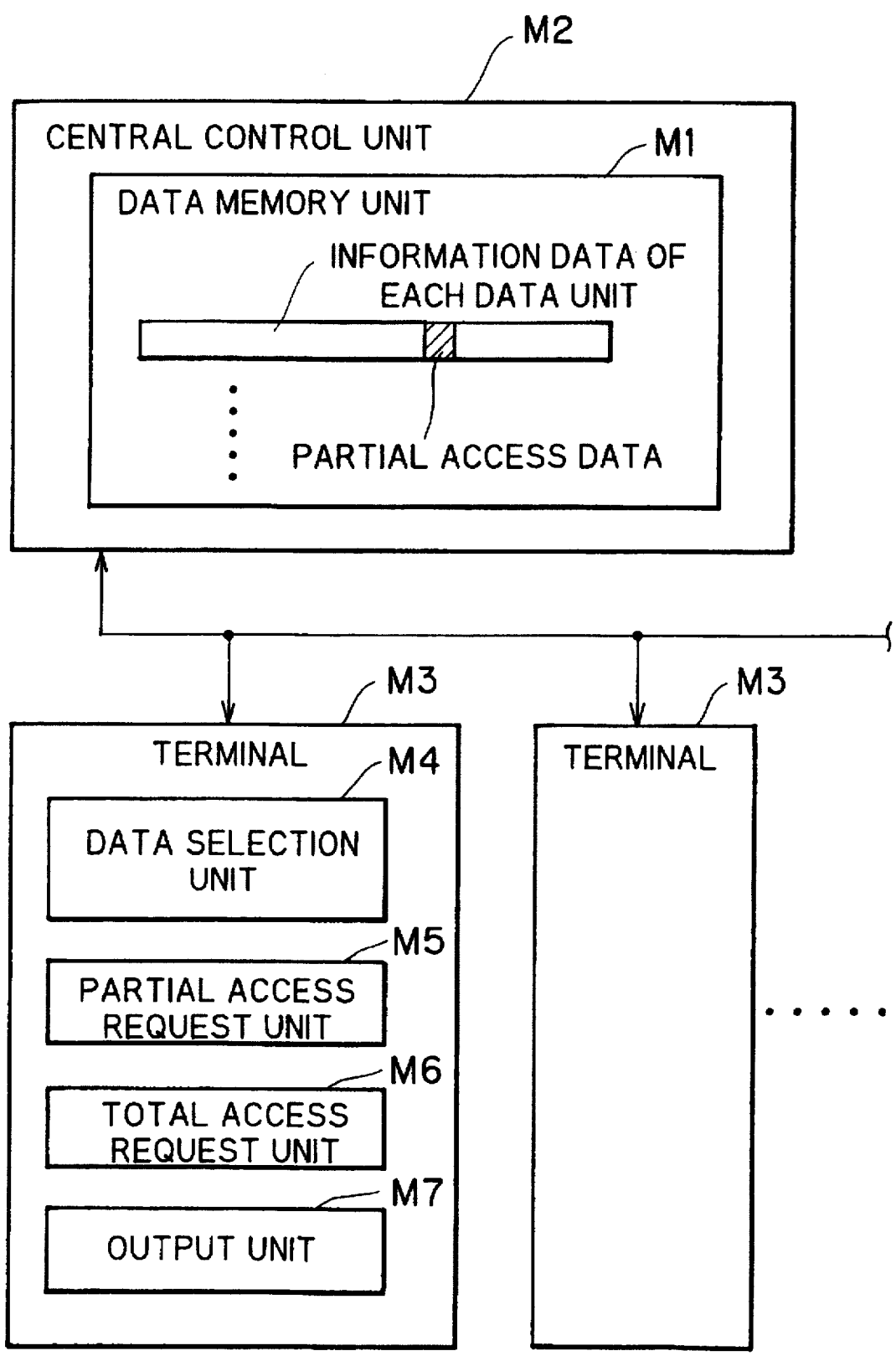
FIG. 1 is a schematic structural diagram showing the basic structure of a data transmission device of a preferred embodiment of the present invention.

A data transmission device according to a preferred embodiment of the present invention will be described while referring to the accompanying drawings wherein like parts and components are designated by the same reference numerals as those shown in FIGS. 1 through 8 to avoid duplicating description.

A basic structure of a data transmission device of the preferred embodiment will be described below with reference to FIG. 1.

In a data transmission device of the present embodiment, a central control unit M2 includes a data memory unit M1 for storing information data, including image information, sound information, or both, in separate predetermined plural data units. A predetermined portion of each predetermined data unit of the information data is set as partial access data for indicating the content of the information data of the each data unit. A plurality of terminals M3 are connected to the central control unit M2 via transmission lines so that the information data can be transmitted from the central control unit M2 to the plurality of terminals M3.

Each terminal M3 includes: a data selection unit M4 for selecting a desired information data of at least one predetermined data unit out of the information data stored in the memory unit M1 in the central control unit; a partial access request unit M5 for requesting partial access of the information data selected by the data selection unit M4; a total access request unit M6 for requesting total access of the information data selected by the data selection unit M4; and an output unit M7 for, based on the information data transmitted from the central control unit, reproducing and outputting image information, sound information, or both from the partial access data in response to the partial access request performed by the partial access unit M5 and from the entire data unit in response to the total access request performed by the total access unit M6.

When the information data in question is data for reproducing a karaoke song, a climactic passage of the karaoke song could be set for the partial access data for accurately illustrating the content of the karaoke information data. When the information data in question is for reproducing a movie, data for a climactic scene of the movie could be set as the partial access data of the movie. More particularly, when the partial access data for a two hour movie is made up of one minute of data, there is no need for the partial access data to be from one consecutive minute of the movie. Data for two 30 second sections, one from the first half of the movie and another from the second half of the movie, can be combined to form the one minute of partial access data.

According to the data transmission device configured as described above, the information data stored in the data memory unit M1 of the central control device M2 is divided into predetermined plural data units. A predetermined portion of each predetermined data unit is demarcated as partial access data reflecting the overall content of the information of the each data unit. One or more desired information data units from the information data stored in the data memory means M1 are selected by the data selection unit M4 of the terminal device M3. When the partial access request means M5 requests partial access of information data selected by the data selection unit M4, according to the partial access request, the output unit M7 reproduces only partial access data based on the information data transmitted from the central control device M2 and outputs the corresponding sound and/or image information. On the other hand, when the total access request unit M6 requests total access of information data selected by the data selection unit M4, according to the total access request, the output unit M7 reproduces all the information data of the predetermined data unit based on the information data transmitted from the central control device M2 and outputs the resultant sound and/or image information.

The partial access data of the present invention is configured to portray the overall content of the information data of the corresponding data unit. For example, when the information data in question is for reproducing karaoke songs, data for a climactic passage of each song could be set as its partial access data. When the information data in question is for reproducing a movie, the partial access data could be formed from data of a climactic scene of the movie. In these examples, one minute of data would be sufficient for partial access data of a movie and 15 seconds of data would be sufficient for that of a karaoke song.

The partial access request unit M5 may request directly to the central control unit M2 for partial access of the information data selected by the data selection unit M4. In other words, the partial access request unit M5 may request the central unit M2 to transmit the partial access data of the data unit selected by the data selecting unit M4. The total access request unit M6 may request directly to the central control unit M2 for total access of the information data selected by the data selection M4. In other words, the total access request unit M6 may request the central unit M2 to transmit the entire data of the data unit selected by the data selecting unit M4. The output unit M7, in response to the partial access request, reproduces and outputs image information, sound information, or both from the partial access data transmitted from the central control unit M2 and, in response to the total access request, reproduces and outputs image information, sound information, or both from the entire data unit (total access data) transmitted from the central control unit M2.

With the data transmission device as structured above, requests for partial access by the partial access request unit M5 and requests for total access by the total access request unit M6 are made directly to the central control device M2. The central control device M2 transmits only partial access data of the selected data unit of information data in response to a partial access request or all of the selected data unit of information data in response to an total access request. The output unit M7 then outputs the transmitted data.

For example, when a great deal of information data must be transmitted, as is the case when transmitting a movie, it is desirable to make partial access requests directly with the central control device M2. The central control device M2 will transmit only partial access data, which is then reproduced at the output unit M7.

The central control unit may be structured so as to transmit entire data of the data unit selected by the data selecting unit M4, regardless of whether the access requesting units M5 or M6 performs the requests. Each terminal M3 may further include a temporary memory unit for temporarily storing the data unit of the information data transmitted from the central control unit M2 according to the selection made by the data selection M4. The output unit M7, in response to a partial access request made by the partial access unit M5, reproduces only the partial access data out of the data unit of information data stored in the temporary memory means unit, and outputs resultant image information, sound information, or both. The output unit M7, in response to an total access request made by the total access unit M6, reproduces all of the data unit of information data stored in the temporary memory unit and outputs resultant image information, sound information, or both.

With the data transmission device structured as described above, the central control device transmits all information data of the data unit selected by the data selection unit M4, whereupon it is temporarily stored in the temporary memory unit. When partial access is requested, only the partial access data is reproduced from the data unit stored in the temporary memory means. When total access is requested, all of the information data of the data unit stored in the temporary memory unit is reproduced.

For example, when a small deal of information data must be transmitted, as is the case when transmitting a karaoke song, it is desirable that the central unit M2 transmits entire data of the selected karaoke song data upon being selected by the selecting unit M4 and that the terminal stores the entire data in the temporary memory unit. Only a partial access data is reproduced from the data when the partial access is requested, and the entire data is reproduced when the total access is requested.

The center may further include a payment information processing unit for performing a predetermined payment information process when the total access unit M6 requests total access of the selected information data.

A concrete example of the above-described data transmission device of the present invention will be described below with reference to FIGS. 2 through 7. This example is a karaoke system to which applied is the above-described embodiment of the present invention. In this karaoke system, when a user requests a song he/she desires to sing at each terminal, karaoke song data of the requested song and background image data appropriate for the requested song are transmitted from the center to the terminal. Upon receiving those data, the terminal plays accompaniment music of the requested song while displaying the lyrics of the song and a background image behind the display of the lyrics. It is noted that this karaoke system is of a pay per song type in which karaoke performance at each terminal must be paid separately for each karaoke song.

Figure 2:
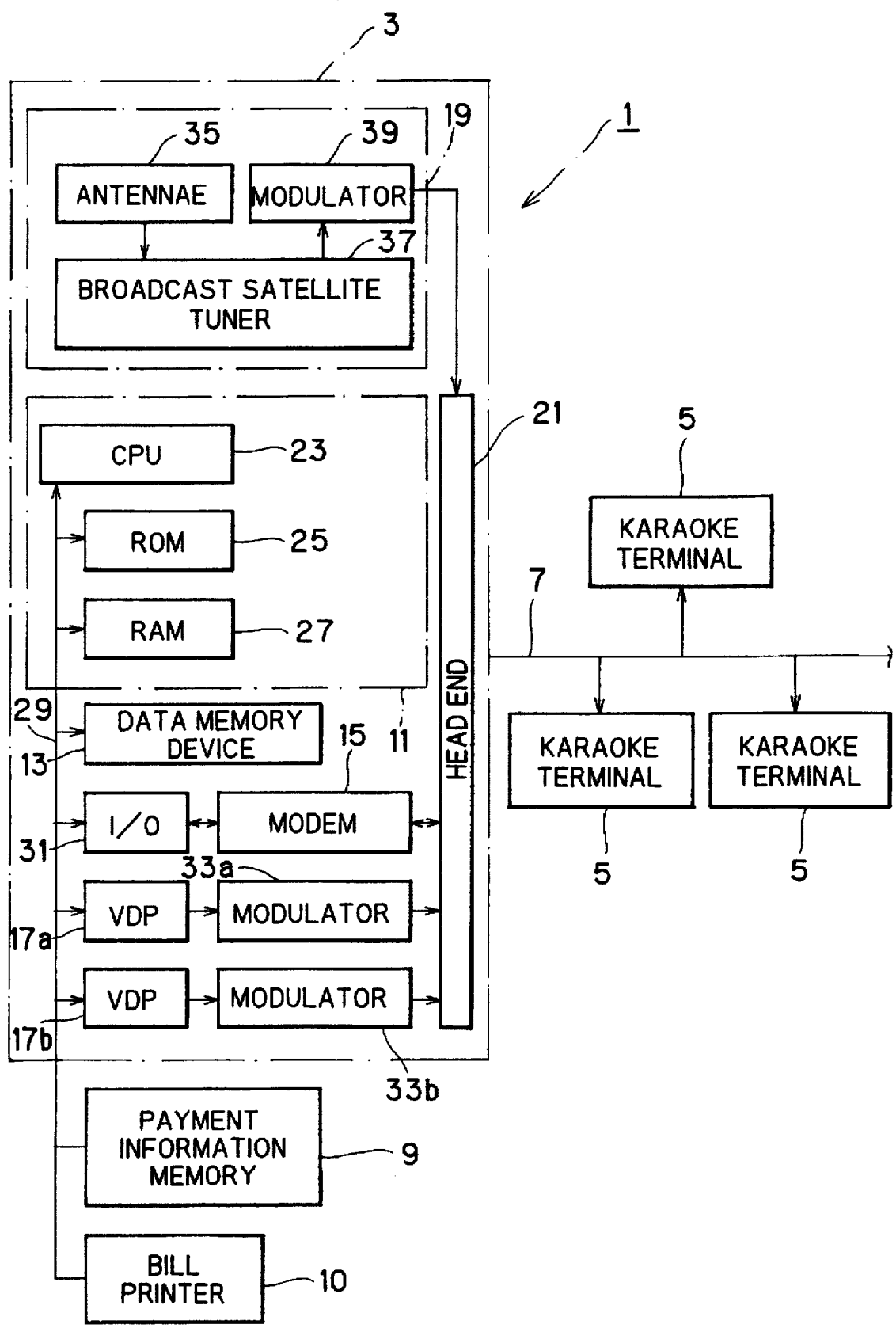
FIG. 2 is a block diagram showing schematic structure of an overall karaoke system and structure of a center according to a concrete example of the embodiment.

As shown in FIG. 2, the karaoke system 1 according to the present example is constructed from a center 3 connected to a plurality of karaoke terminals 5 by a coaxial cable 7 (transmission line). The terminals 5 can be provided in separate buildings such as separate houses for home entertainment or in separate shops or booths within the same building established for entertaining customers.

Next, an explanation of configuration of the center 3 will be provided while referring to FIG. 2.

The center 3 includes a server (control portion) 11 for performing overall control of the center 3; a memory device 13 in which karaoke song data are stored; a center modem 15; background image output devices (VDP) 17a and 17b; broadcast satellite reception system 19; a head end 21, etc.

The server 11 includes well-known components such as a central processing unit (CPU) 23, a ROM 25, and a RAM 27. A busline 29 is provided for connecting the server 11 to the memory device 13, an input/output interface (I/O) 31, the background image output devices 17a and 17b, and the like.

The RAM 27 stores a mode management table for indicating a present operation mode of each of the plurality of terminals 5.

The server 11 is for producing a mode sense polling signal and a request polling signal. The mode sense polling signal is a signal for confirming an operation mode of each terminal 5. The request polling signal is a signal for confirming whether a request for transmission of karaoke song data is present at each terminal that is in the karaoke mode.

A large-capacity memory device, such as a hard disk or a magnetooptic disk, is used in the memory device 13. Several thousand songs worth of karaoke song data are stored in the memory device 13.

Figure 4:
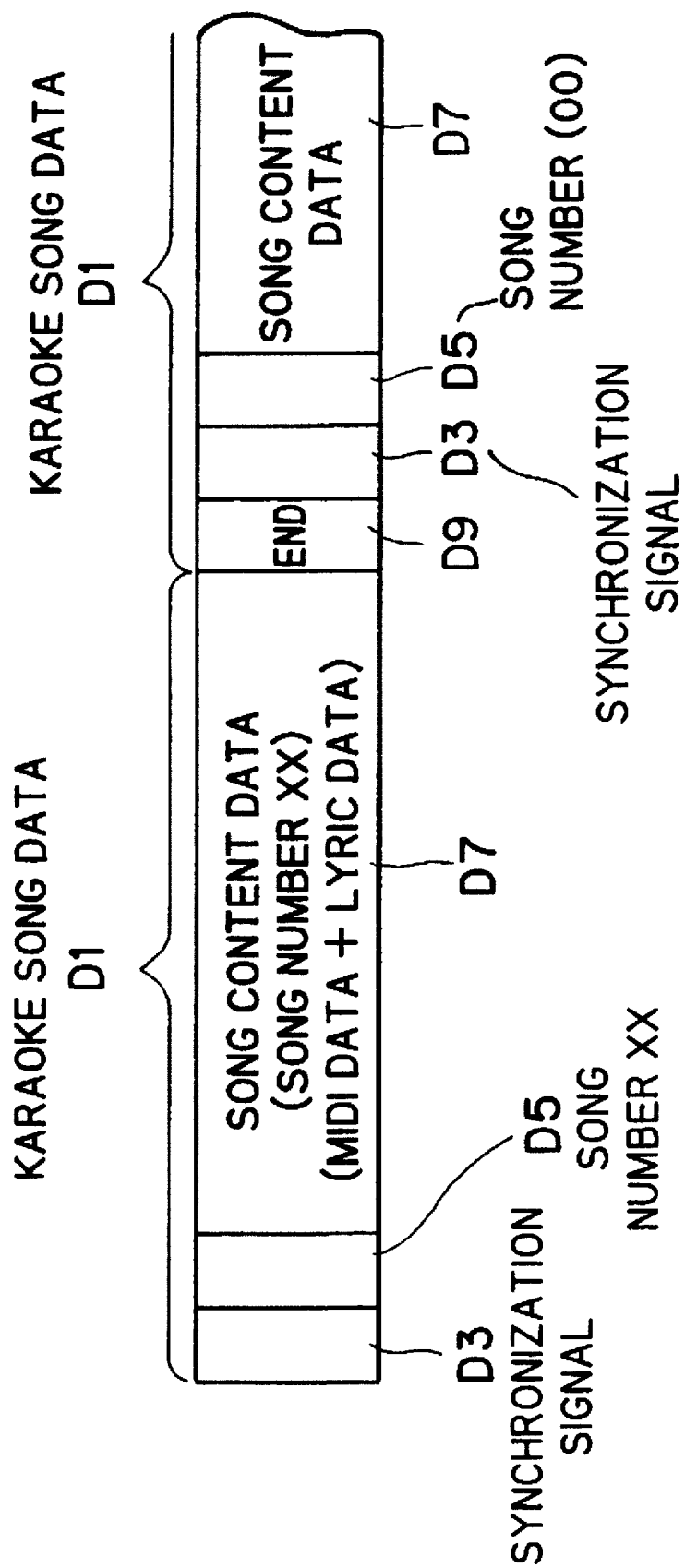
FIG. 4 is an explanatory diagram showing structure of a karaoke song data of the embodiment.

As shown in FIG. 4, one song worth of karaoke song data D1 includes: a synchronization signal D3; song number data D5 that indicates the song number; song content data D7; and partition data D9 for indicating the end of the one song worth of karaoke song data. The song content data D7 includes lyric data, for being projected on a monitor television of the terminal 5 (to be described later), and instrumental accompaniment data, for being played by a sound source of the terminal 5 (to be described later). It is noted that the accompaniment data is MIDI (Musical Instrument Digital Interface) standard data.

Figure 5:
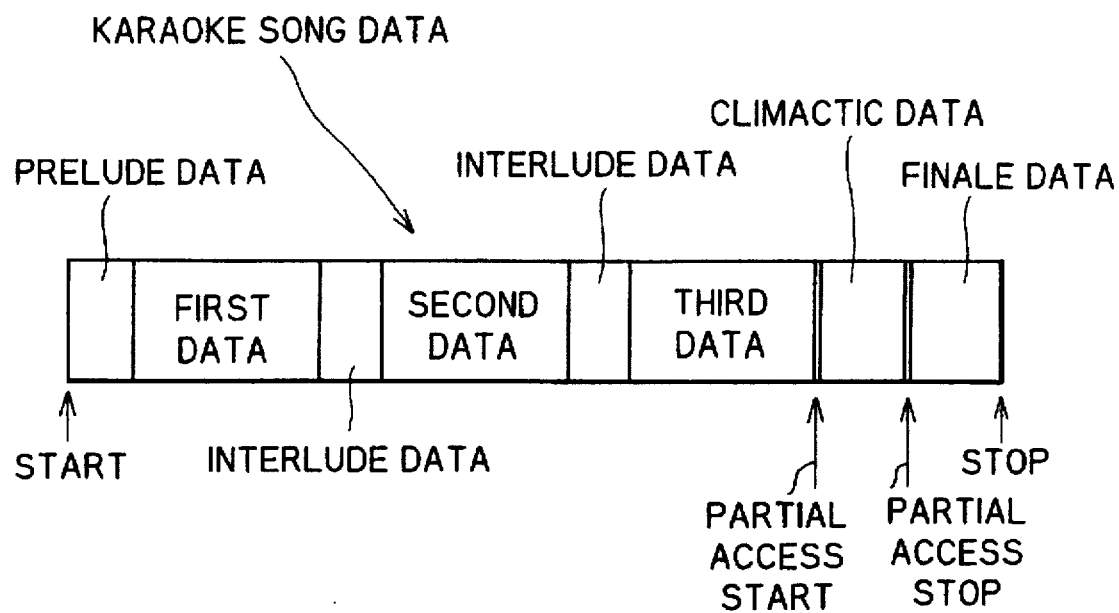
FIG. 5 is an explanatory diagram showing that the karaoke song data of FIG. 4 is constructed from a plurality of parts including a climactic part of a corresponding song.

Generally, each karaoke song is constructed from a prelude part, a plurality of singing passages including a climactic passage, interlude parts between the successive singing passages, and a finale part. The climactic part is characteristic to each song. The general configuration of the song content data of each karaoke song data is therefore structured as shown in FIG. 5, for example. It is noted that the configuration of FIG. 5 is only a typified example, not all data of karaoke songs will have the same configuration. In FIG. 5, the song content data includes prelude data, first passage data, interlude data (between first and second data), second passage data, interlude data (between second and third data), third passage data, climactic data, and finale data. According to the present invention, the climactic data indicating the climactic passage is used as a partial access data, as will be described later.

As shown in FIG. 2, the center modem 15 is for modulating karaoke song data retrieved from the memory device 13, mode sense polling signals and request polling signals outputted from the server 11, and the like into alternating current signals of a predetermined same channel (that is, a predetermined same frequency band), and then outputting the alternating current signals to the head end 21.

The background image output devices (video disk players) 17a and 17b are for outputting background image data (video signals according to standard National Television System Committee (NTSC) system) for projecting videos on the monitor television of the terminal 5 (to be described later). The background image data are categorized according to genre of karaoke songs requestable by the terminals 5. In this concrete example, one output device 17a may store image data directed toward Japanese ballads (Enka), and the other output device 17b may store image data directed toward popular songs. Background image output devices 17a and 17b are connected to individual modulators 33a and 33b. The background image data outputted from the output devices 17a and 17b are modulated by the corresponding modulators 33a and 33b into alternating current signals of channels (frequency bands) different from each other. The alternating current signals of the different channels are inputted to the head end 21.

It is noted that the channels for the background image data are different from the channel over which the karaoke song data, the mode sense polling signals and the request polling signals are transmitted. For example, each of the devices 17a and 17b always outputs the background image data. Accordingly, the background image data are always transmitted to the terminals 5.

The broadcast satellite reception system 19 includes a reception antennae 35, a broadcast satellite tuner 37, and a modulator 39. The modulator 39 is connected to the head end 21. The tuner 37 outputs broadcast satellite signals including broadcast satellite image signals and broadcast satellite sound signals. The modulator 39 modulates the broadcast satellite signals from the tuner 37 into alternating current signals of a channel (frequency band) which is different from the channel (frequency band) over which the karaoke song data, the mode sense polling signals, and the request polling signals are transmitted and the channels (frequency bands) over which the background image data are transmitted. For example, the tuner 37 always outputs the broadcast satellite signals. Accordingly, the broadcast satellite signals are always transmitted to the terminals 5.

The head end 21 includes a variety of devices (not shown) such as a mixer for mixing signals inputted thereto and for outputting the mixed signals to the coaxial cable 7. Modulated signals of karaoke song data sent from the center modem 15; mode sense polling signals and request polling signals sent from the center modem 15; background image signals from the modulators 33a and 33b; and broadcast satellite signals from the modulator 39 which have been modulated in different channels are inputted to the head end 21. The head end 21 multiplexes the plurality of different channel signals, and outputs them to the coaxial cable 7, along which the multiplexed signals are transmitted to the terminals 5.

The center 3 is further provided with a payment information memory 9 and a bill printer 10. The payment information memory 9 and the bill printer 10 are connected to the server 11 by the busline 29. The payment information memory 9 is for storing information on a state how a payment has been agreed for karaoke performances at each terminal 5. For example, the payment information memory 9 is for storing the number of times at which a payment has been agreed for karaoke performances at each terminal 5. The bill printer 10 is for printing a bill for the karaoke performances conducted at each terminal 5 based on the information stored in the memory 9. In the payment information memory 9, the number of times at which the payment has been agreed at each terminal is incremented by one every time when the request of total access of a song is transmitted from the corresponding terminal. The bill printer 10 prints a bill, based on the total number of times at which the payment has been agreed at each terminal by each customer.

Figure 3:
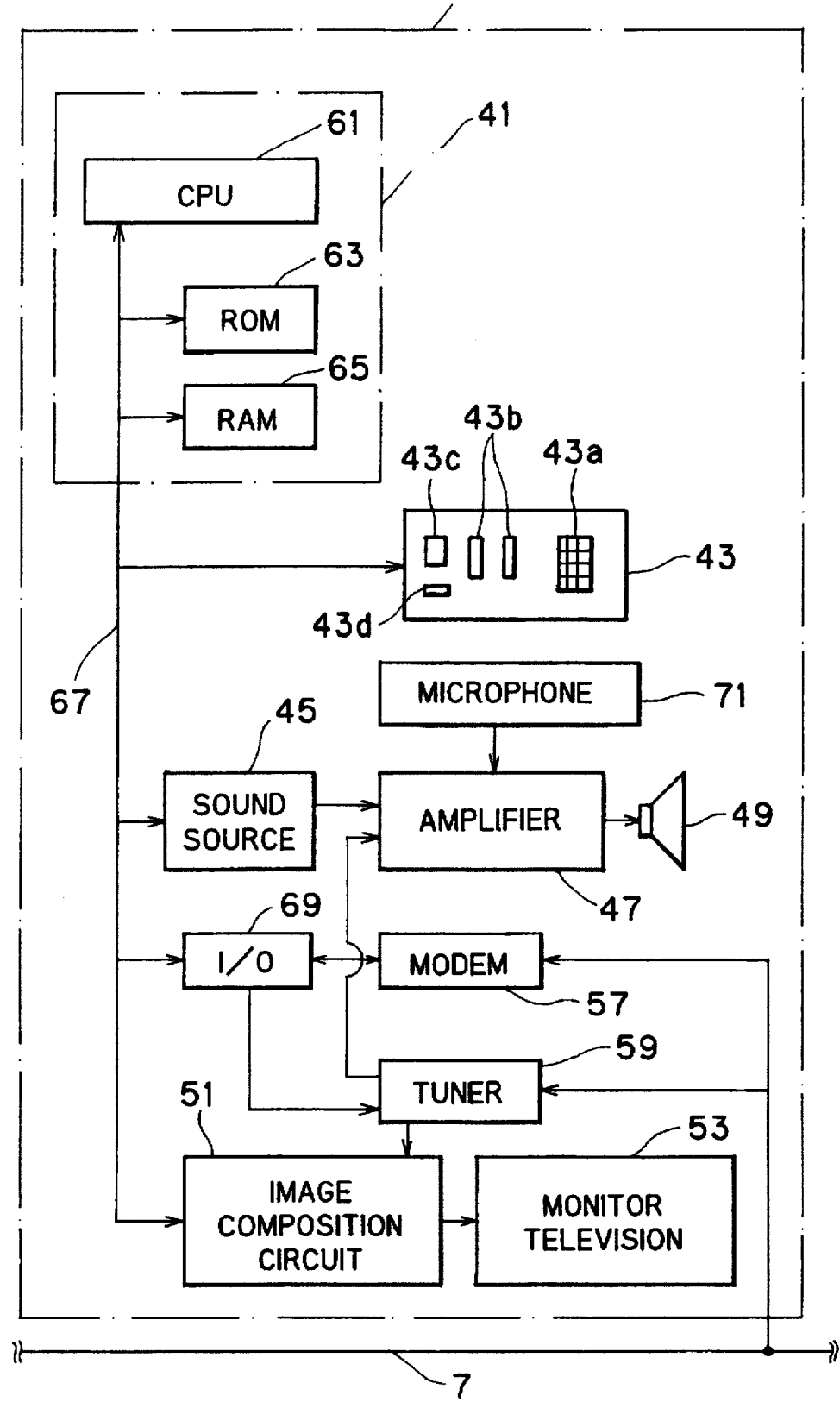
FIG. 3 is a block diagram showing structure of a terminal of the concrete example of the embodiment.

Next, an explanation of the structure of each terminal 5 will be provided while referring to FIG. 3.

Each karaoke terminal 5 includes a control portion 41 for overall control of the terminal, an input device 43, a sound source 45, an amplifier 47, a speaker 49, an image composition circuit 51, a monitor television 53, a terminal modem 57 for receiving and processing the signals (the karaoke song data, the mode sense polling signals and the request polling signals) sent from the center 3, and a video tuner 59 for receiving and processing the signals (the background image data and the broadcast satellite signals) sent from the center 3, etc.

The control portion 41 includes a CPU 61, a ROM 63, and RAM 65, and is connected to the input device 43, the sound source 45, an input/output interface 69, the image composite circuit 51, and the like via a busline 67.

The RAM 65 previously stores therein a song name/song genre information data indicating a genre of each of a plurality of karaoke songs requestable by the terminals 5.

Examples of genre include Japanese ballads (enka) and popular songs, in this concrete example. The RAM also serves to temporarily store entire data or climactic data of the karaoke song data for a karaoke song requested at the input device 43 and transmitted from the center 3.

The control portion 41 is for producing a mode response signal and a request response signal. The mode response signal is a signal by which each terminal responds to the center 3 about its own operation mode in response to a mode sense polling signal from the center 3. The request response signal is a signal for responding to the center 3 about whether there is a request for a song (that is, a request for transmission of karaoke song data), in response to a request polling signal from the center 3. If a request has been made, the song number data of the requested karaoke song and a type of access desired to be conducted is attached to the request response signal.

The input device 43 includes a variety of key switches by which a user operates the terminal 5. More specifically, the input device 43 includes a number pad (ten key) 43a for inputting song numbers of requested songs; mode keys 43b for selecting various operation modes; a power source switch 43c for turning the power source on and off; and a payment agreement key 43d for indicating willingness to pay for the requested song. The operation modes of the terminal 5 include a karaoke mode for receiving karaoke song data transmitted from the center 3 and for performing karaoke; and a broadcast satellite mode for receiving a broadcast signal from the center 3 and allowing viewing of the satellite broadcast. As will be described in detail later, with the mode key 43b, a user can indicate desire to check the content of a karaoke song.

The terminal modem 57 is for receiving and demodulating the karaoke song data, the mode sense polling signals, and the request polling signals that are transmitted from the center 3 via the coaxial cable 7. The terminal modem 57 also modulates signals, such as mode response signals and request response signals outputted from the control portion 41, and transmits them to the center 3.

The video tuner 59 is for receiving the satellite broadcast signals, outputted from the broadcast signal system 19 and transmitted from the center 3, and the background image signals, outputted from the background image output devices 17a and 17b and transmitted from the center 3, and for selecting the channel of the desired signal. That is, when the karaoke mode is designated as the operation mode using the mode key 43b of the input device 43, one of the channels is selected, over which the background image signals appropriate for the genre of the requested song are transmitted. When the broadcast satellite mode is designated as the operation mode using the mode key 43b of the input device 43, the channel over which the broadcast satellite signals are transmitted is selected.

A microphone 71 is provided in each terminal 5 to produce a singing voice signal when a user sings into the microphone.

The sound source (synthesizer sound source) 45 is for converting the MIDI data (accompaniment data), included in the karaoke song data shown in FIG. 4, into an analog karaoke accompaniment/sound signal.

The amplifier 47 is for receiving both the karaoke accompaniment/sound signal and the singing voice signal from the microphone 71. The amplifier 47 mixes the accompaniment/sound signal and the singing voice signal, amplifies the mixed signal, and outputs it to the speaker 49. The amplifier 47 is also for receiving, from the tuner 59, the broadcast satellite sound signal included in the broadcast satellite signal.

The image composition circuit 51 converts lyric data, included in the karaoke song data, into a lyric image signal, superimposes it onto a background image signal inputted from the video tuner 59, and outputs it to the monitor television 53. The image composition circuit 51 is also for receiving, from the tuner 59, the broadcast satellite image signal included in the broadcast satellite signal.

Next, an explanation of operation of the karaoke system 1 according to the present embodiment having the above-described structure will be provided.

First, an explanation of the operation of the center 3 will be provided.

Figure 6:
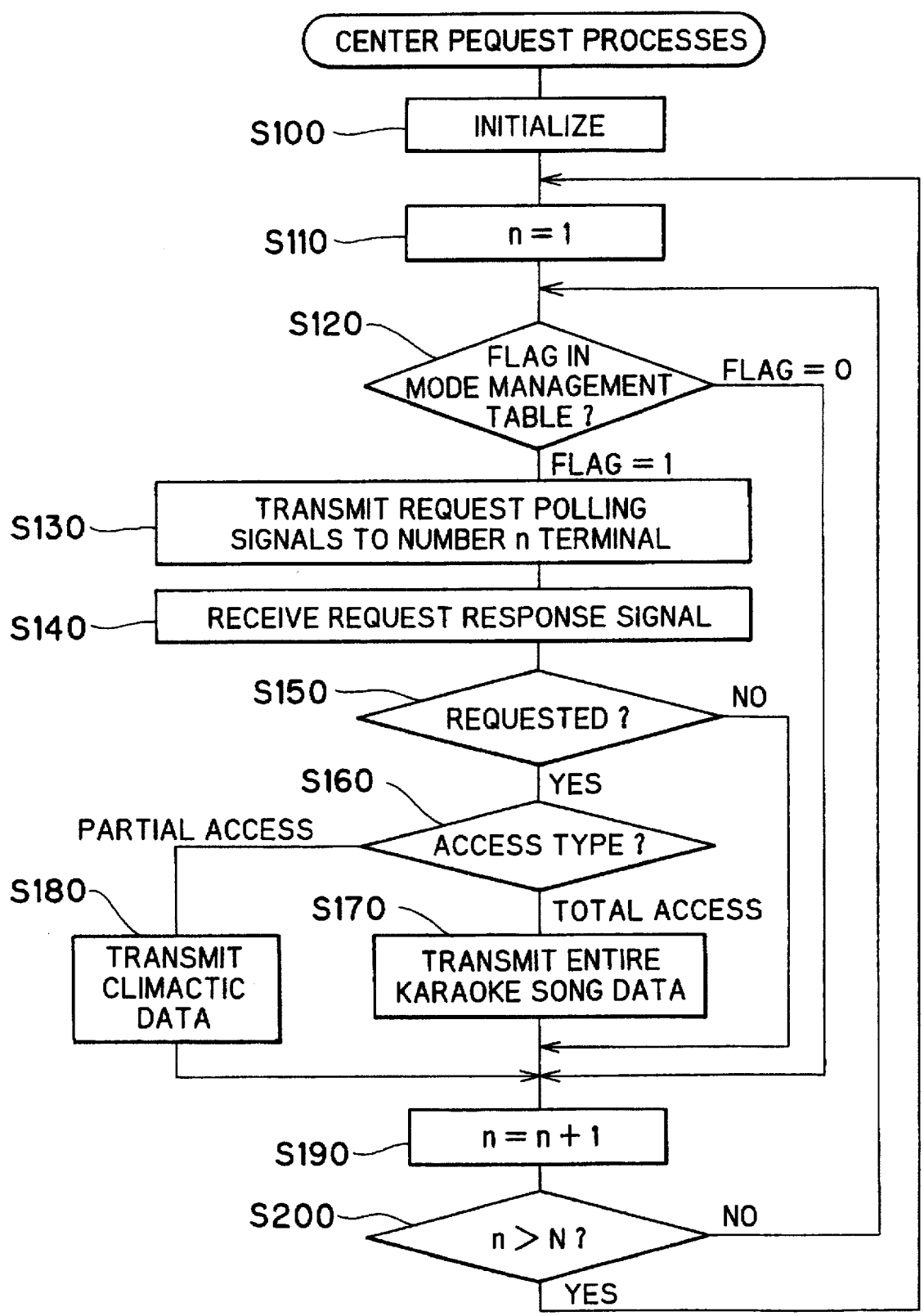
FIG. 6 is a flowchart showing center request processes conducted by the center of the present embodiment.

The server 11 in the center 3 executes mode sense processes and center request processes shown in the flow-chart in FIG. 6. The mode sense processes are for transmitting mode sense polling signals to all of the plurality of terminals 5 so as to detect the respective operation modes of all the terminals. The center request processes are for transmitting request polling signals only to the terminals 5 that are determined by the mode sense processes to be in the karaoke mode so as to detect whether the terminals in the karaoke mode request transmission of karaoke songs.

The center request processes of FIG. 6 are continually executed. Request polling signals, for interrogating whether or not a song request is present, are transmitted only to terminals 5 that are determined to be in karaoke mode by the mode sense processes. The mode sense processes are repeatedly executed every predetermined time period (for example, every 30 seconds) by a timer interrupt of the center request processes. That is, the center request processes are interrupted every predetermined time period, and the mode sense processes are executed.

The mode sense processes will be described below. In the mode sense processes, mode sense polling signals are transmitted in succession to all of the karaoke terminals 5 connected to the center 3. Each terminal 5 transmits a mode response signal in response to these mode sense polling signals. The center 3 determines whether or not each terminal 5 is in the karaoke mode based on the mode response signals, and the result of the determination is stored in the mode management table of the RAM 27. That is, when a mode response signal is received that indicates a terminal is in karaoke mode, the terminal is determined as being in karaoke mode. When a mode response signal is received that indicates a mode other than the karaoke mode, that the mode is not karaoke mode is determined. It is noted that when no response signal is transmitted from a terminal within a predetermined time period after the transmission of the mode polling signal to the terminal, it can be determined that the terminal is being turned off and therefore that the terminal is not karaoke mode. When a terminal is determined as being in karaoke mode, a mode flag for the terminal in the mode management table is set to one (1). When a terminal is determined as being in a mode other than the karaoke mode, the flag is set to zero (0).

Next, the center request processes will be described below with reference to FIG. 6.

When the center 3 is turned ON, the CPU 23 starts conducting the center request processes. The CPU 23 continues executing the center request processes, until the center 3 is turned OFF.

In the center request processes, the CPU 23 first performs initialization to clear the RAM 27 and the like, in step S100. Then, in step S110, the CPU 23 sets the terminal number n to one (1). The CPU 23 refers to the flag for the number n terminal 5 in the mode management table of the RAM 27 in step S120. When the flag is determined as one (1), it is determined that the number n terminal is in the karaoke mode. Accordingly, the CPU 23 produces a request polling signal added with an address code indicating the terminal number n. The modem 15 modulates the request polling signal and outputs it toward all the terminals 5, in step S130. Upon receiving the request polling signal, each of the karaoke terminals 5 refers to the address code attached to the request polling signal to determine whether this request polling signal is for itself. Accordingly, the number n terminal 5 determines that the request polling signal added with the address code of the corresponding terminal number n is for itself.

Then, in step S140, a request response signal is transmitted from the number n terminal 5 to the center 3, in response to the request polling signal. The request response signal transmitted from the number n terminal indicates whether there is a request for a karaoke song at the number n terminal. It is noted that when a request has been made at the number n terminal, the request response signal is added with the song number data of the requested song and the access type required to be conducted for this requested song. Accordingly, in step S150, the CPU 23 processes the request response signal to judge whether there is a song request at the number n terminal. If it is determined that a request has been made at the number n terminal, the type of access requested is determined in S160. When total access is requested, entire part of the karaoke song data of the requested song is retrieved from the memory device 13 based on the song number data included in the signal. The data is then transmitted to the number n terminal device 5 (S170). It is noted that the data is added with an address code indicating the terminal number n, in the same manner as the request polling signal, so that the data will be properly received by the number n terminal. In S170, the CPU 23 also performs to increment by one the number of times at which the payment has been agreed at the number n terminal, that is stored in the payment information memory 9. When partial access is requested, only data for the climactic passage of the requested karaoke song (climactic data) is retrieved from the memory device 13 based on the song number data included in the signal in S180. The data is then transmitted to the number n terminal device 5.

If it is determined in the step S150 that there has been made no request in the number n terminal, the program proceeds directly to the step S190.

On the other hand, if the flag for the number n terminal in the mode management table of RAM27 is determined to be zero (0) in the step S120, because it is determined that the number n terminal is not in the karaoke mode, the program proceeds directly to the step S190 without executing the above steps S130 through S180. That is, the request polling signals are not transmitted to the terminals not in the karaoke mode.

Then, in the step S190, the terminal number n is incremented by one (1) (n=n+1). The program then proceeds to step S200 to judge whether the terminal number n is greater than the maximum terminal number N (=total number of the terminals 5 connected to the center 3). If determined as not greater, the program returns again to step S120 and the processes in steps S120 through S190 are repeated on the number n+1 terminal. On the other hand, if n is determined as being greater than N in step S200, the program returns to step S110 where the terminal number n is set to one (1) and the processes in steps S110 through S190 are again performed from the number one terminal 5.

In this way, by referring to the flag in the mode management table in the center request processes, request polling signals are transmitted only to terminals 5 that are in the karaoke mode. Therefore, request polling signals need not be transmitted to terminals that do not need karaoke song data (i.e, terminals 5 other than those in the karaoke mode). A great deal of wasteful polling time can be eliminated. Therefore, the waiting time until a request polling signal is received in a terminal 5 that is in the karaoke mode is reduced. Karaoke data of requested songs can be received in a short waiting time and users can immediately enjoy karaoke.

Next, operations in each terminal 5 will be explained.

Figure 7:
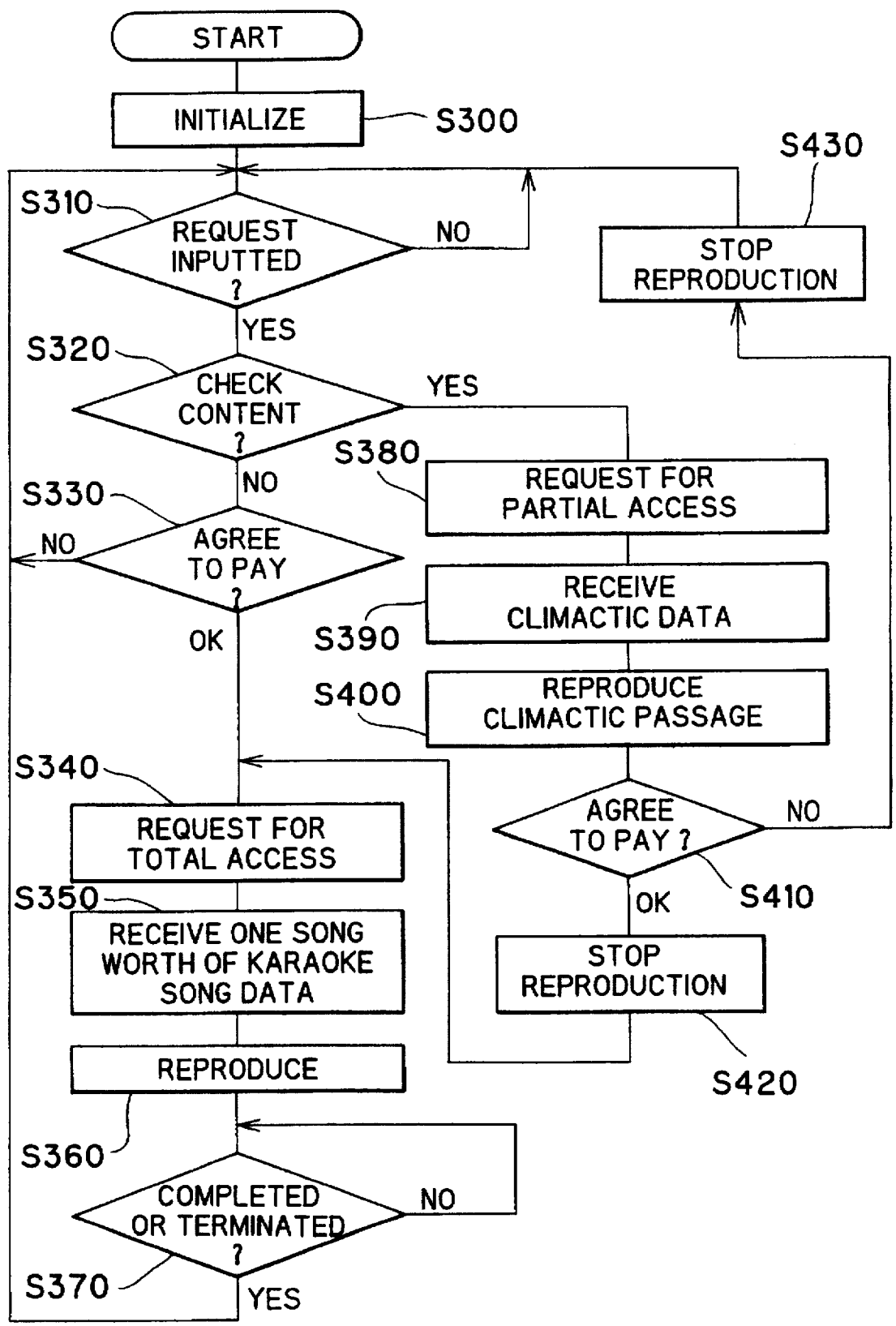
FIG. 7 is a flowchart showing karaoke request processes conducted in the terminal of the present embodiment.

Each terminal 5 executes mode input processes for determining an operation mode desired to be conducted by the user and karaoke request processes shown in FIG. 7 which are conducted when the karaoke mode is inputted in the mode input processes. The mode input processes are for detecting input from the keys of the input device 43 so as to receive the operation mode set to the terminal 5. When mode sense polling signals are transmitted from the center 3, the mode input processes transmit mode response signals, that indicate the presently set operation mode of the terminal, to the center 3 in response to the mode sense polling signals. The karaoke request processes are for detecting input from the keys of the input device so as to receive the input of the song number of the requested song and the requested access type. When request polling signals are transmitted from the center 3, the karaoke request processes transmit request response signals, that respond as to whether a song has been requested at the terminal and as to the requested song number and the requested access type when the song has been requested, in response to the request polling signals. When the karaoke song data is transmitted from the center 3 to the terminal, the karaoke request processes also process the karaoke song data so that karaoke can be performed.

Next, an explanation of the karaoke request processes achieved by the karaoke mode terminal 5 will be provided while referring to FIG. 7.

Initialization processes, such as clearing the RAM 65 (see FIG. 3), are performed in S300. Whether or not a request of any song number has been inputted from the input device 43 at the number pad 43a is determined in S310. If no input of the song number has been made, the program returns to S310 repeatedly until an input key is manipulated. During the time period until any song number is inputted, when request polling signals are transmitted from the center, the terminal 5 transmits to the center 3 the request response signals indicating that no request has been made.

When a request is determined to have been inputted (i.e., S310 is YES), whether or not the request is to check the content of a karaoke song is determined in S320. In other words, S320 determines whether or not the user requests partial access for his/her requested karaoke song. The determination of S320 could be based on whether or not a key for indicating a request to check the content of the data has been depressed at the input device 43. The mode key 43b is an example of such a key. In this case, a message could appear on the television screen prompting the viewer to decide whether he/she wants to check the content.

If content check is not required (i.e., S320 is NO), whether or not the user will pay for the data information is determined in S330. In other words, S330 determines whether or not the user requests total access for his/her requested karaoke song. This determination could be made in a manner similar to the determination of S320. That is, the determination could be made by determining whether or not the user has depressed the payment key 43d on the input terminal 43 indicating agreement to pay for the information. A message could appear on the television screen prompting the viewer to decide whether he/she will pay for the data.

When the user decides not to pay for the data (i.e., S330 is NO), the program returns to S310. When the user decides to pay for the data (i.e., S330 is YES), the program proceeds to perform processes in S340. The program can also be designed to automatically return to S310 if the user does not press any key after a predetermined period of time passes in either S320 or S330.

S340 transmits a request for total access to the center 3, upon receiving a request polling signal. That is, S340 waits for the request polling signal from the center and, upon receiving the request polling signal, transmits to the center a request response signal requesting transmission of the entire data of the requested song. This request response signal contains data indicating the song number of the requested song and data indicating the requested access type, that is, total access. Then, in S350, the terminal receives karaoke song data for the requested song transmitted from the center 3 in response to the request response signal. The CPU 61 temporarily stores the karaoke song data in the RAM 65.

Afterward, karaoke performance processes are performed in step S360. In the karaoke performance processes, the CPU 61 first refers to the song name/song genre information previously stored in the RAM 65, based on which the CPU controls the video tuner 59 to select a channel over which the background image signals corresponding to the genre of the requested song are being transmitted. Then, the CPU retrieves the karaoke song data for the requested song from the RAM 65. The CPU inputs the lyric data included in the karaoke song data to the image composition circuit 51 where the lyric data is converted into a lyric/image signal. Also, the background image signal transmitted over the channel selected by the video tuner 59 is inputted to the image composition circuit 51. The background image signal and the lyric/image signal are superimposed by the image composition circuit 51, whereupon the characters of the lyrics are displayed on the monitor television 53 superimposed on the background image. The CPU inputs the MIDI data (accompaniment data) included in the karaoke song data into the sound source 45, in which the MIDI data is converted into an accompaniment signal before being inputted to the amplifier 47. The accompaniment signal is mixed with the voice signal from the microphone 71 as sung by a user, amplified appropriately, and outputted to the speaker 49.

When reproduction processes of the karaoke song are completed, or when a command for terminating processes has been received (i.e., S370 is YES), the program returns to S310 to wait for another request.

On the other hand, when S320 is a positive determination, that is, when a user indicates a desire to check the content of the karaoke song, the program proceeds to S380. S380 transmits a request for partial access to the center 3, upon receiving a request polling signal from the center. That is, S380 waits for the request polling signal, and upon receiving the request polling signal, transmits to the center a request response signal that requests transmission of only data for the climactic passage of the requested karaoke song. This request response signal therefore includes data on the song number of the requested song and, in this case, data indicating partial access. In response to the request response signal, the center 3 transmits data on the climactic passage of the karaoke song (see S180 in FIG. 6). The terminal device 5 receives the climactic data and temporarily stores it in the RAM 65 in S390. Afterward the terminal device 5 reproduces the climactic passage in S400. The method for reproducing the climactic passage of the song is the same as described for S360, so its explanation will be omitted here.

The process described for S330 for determining whether or not the user will pay for the information data is performed also in S410. In this case, when a determination that the customer either will or will not pay for the song is made in S410 before the end of reproduction of the climactic passage of the song. If the user decides whether or not he/she wants to sing the song before hearing an entire part of the climactic passage and indicates this decision by, for example, depressing the appropriate button on the terminal device 5, the reproduction of the climactic passage of the song is terminated accordingly in S420 or S430 and the program proceeds thereafter to S340 or S310 respectively.

The karaoke system 1 described in the present embodiment is designed so that each song is paid for separately. A customer is given a choice of checking the content of the selected song by listening to its climactic passage before actually requesting the song. After listening to the climactic passage of the song, the user decides whether the song is what he/she would like to sing or hear. If the user does not like the song, he/she can indicate this by, for example, depressing the appropriate key on the terminal device 5. This would result in a NO determination at S410. The user could then request partial access of data on a different song and make another decision regarding the other song in the same way.

On the other hand, if after listening to the climactic passage of the song, the user wants to sing or listen to the complete song, he/she indicates this, which results in a YES determination in S410, whereupon the program proceeds to S340 where total access of all the data for the selected song is requested. Then all the data for the karaoke song is transmitted from the center 3 and reproduced in the terminal device 5.

As described above, in the present embodiment, when the terminal 5 requests a partial access of a desired karaoke song to the center 3 in S380, only the climactic passage data of the karaoke song is transmitted from the center 3 to the terminal 5. The terminal 5 reproduces the climactic passage in S400. Then, the terminal 5 determines whether or not the user will pay for the karaoke song in S410. When the payment is confirmed, the terminal 5 requests total access to the center 3 in S340, receives the entire data of the karaoke song in S350, and reproduces the data in S360. It is possible to prevent the user from erroneously requesting a total access of a karaoke song which the user does not want to sing. It is ensured that the user can obtain karaoke songs which he/she really wants to sing, within a short period of time.

A method, in which karaoke songs are selected by the song title only, suffices when a user is familiar with the selected song. However, when a user is not familiar with the selected song, this method provides no way for the user to determine early on whether the selected song is actually the type of song that the user wants to sing or hear. For example, sometimes the user would realize that the song is not what he/she has expected only after singing the song to the end. That is, although after listening to the end of the song the user realizes that the song is not one he/she likes, the user can often not make this determination until after hearing the song to the end. To solve this problem, according to the present embodiment, the user can listen directly to only the climactic passage of the song. Therefore, users can make more educated selections about what songs they want to hear or sing, thereby preventing unnecessary selections or terminations of reproduction midway through the song.

This is particularly the case with systems where each song must be paid for separately. Choosing a song and discovering midway through that the song is not what has been desired can lead to a sense of financial loss. However, in the present embodiment, users are allowed to check the content of the selected song free of charge by listening to the climactic passage of the song. Therefore, a user is less likely to be disappointed with the content of the song after actually requesting the song. Therefore, the sense of financial loss is virtually eliminated.

The present embodiment describes the present invention applied to a karaoke system. However the present invention can be applied to a movie distribution system in the same way as described for the karaoke system with reference to FIGS. 1 through 7. Although almost all karaoke songs last only about three, or at longest five, minutes, movies are normally around two hours long and also the usage fee is usually much higher than for karaoke songs. Accordingly, a user can not determine whether he/she will enjoy the film until viewing the movie to the end or until 30 minutes or an hour through the film.

To show potential viewers what the movie is about, a predetermined climactic scene, which corresponds to the climactic passage of a karaoke song, could be set as the partial access data. Partial access data for three minute's worth of climactic scene should be sufficient for most cases, but the exact amount can be increased or decreased according to the movie. The partial access data need not contain data for one consecutive minute of the two hour movie. Instead, partial access for showing 30 seconds of the first half of the movie could be combined with partial access for showing 30 seconds of the second half of the movie to provide a potential user with a total of one minute of no-charge viewing.

Figure 8:
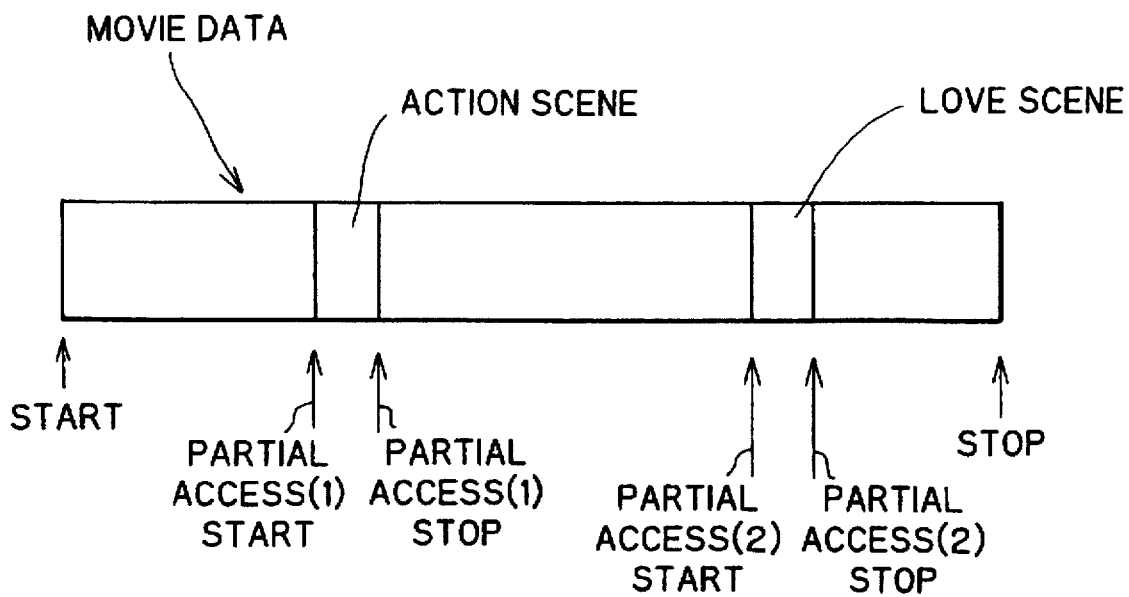
FIG. 8 is an explanatory diagram showing structure of a movie data used for a movie distributing system to which applied is the data transmission device of the present embodiment.

The configuration of movie data is shown schematically in FIG. 8. (For comparative purposes, refer to the configuration of karaoke song data shown schematically in FIG. 5.) In this example, the partial access data includes data of two separate cuts from the movie: an action scene (1) from the first half of the movie; and a love scene (2) from the second half of the movie. The data for the two cuts are played consecutively to form the access data.

It is easier for viewers to select movies with desired content by basing their decision to watch the entire movie on the partial access data for reproducing the action scene and the love scene. However, when viewers can watch all the climactic scenes of movies free of charge, they may begin to feel it unnecessary to pay to watch climactic scenes of movies. To prevent this potential problem, the system could be designed to deny partial access when the number of consecutive requests to partially view the movie exceeds a predetermined number.

A method for requesting movies at S310 may be structured from a single step for directly inputting the title of the movie. A search step may be additionally provided before this title inputting step. For example, a potential viewer could enter a keyword such as a particular movie genre or a director's or actor's name, whereupon all appropriate movies could be searched out and listed on the television screen. A viewer could indicate interest in a portion or all of these movies. The climactic scenes of all the indicated movies could be then consecutively reproduced.

While the invention has been described in detail with reference to specific embodiment thereof, it would be apparent to those skilled in the art that various changes and modifications may be made therein without departing from the spirit of the invention, the scope of which is defined by the attached claims.

For example, in the above-described embodiment, data for either the climactic passage of a karaoke song or for the entire karaoke song is transmitted according to the requested access type. However, one song's worth of data can be always sent to the terminal device immediately upon receipt of a request, regardless of the requested access type. Then, the data is stored in the RAM 65. When a user wants to check the content of the song, only the climactic portion of the data can be extracted and reproduced.

These different methods of operation can be selected depending on the type of data to be distributed. For example, in circumstance like distribution of movies, when great volumes of data are involved, it would be preferable to transmit only the partial access data when a partial access request is received and wait to send all the movie data until the user decides to watch the entire movie. On the other hand, the transmission burden is only slight in circumstance like distribution of karaoke songs when only small volumes of data are involved. Therefore, the system should be set up so that an entire song's worth of data is transmitted to the terminal and stored there first. The user could then select at the terminal device S whether partial access or total access of the data is desired. This would reduce the number of times the coaxially cable 7, which serves as the transmission circuit, is used. Additionally, total access could be accomplished more rapidly. As mentioned above, large amounts of data are involved in distribution of movies, so that a long time is required before all the data is transmitted. Therefore, sending all the movie data to the terminal first off is not practical.

The present invention can also be applied to systems for distributing game software or study materials. Access data for study materials could be data for reproducing example problems. Access data for game software could be a demo program for the game. Although using a climactic passage of the karaoke data is preferable to produce partial access data for karaoke songs and using a predetermined climactic scene is preferable to produce partial access data for movies, designing a different demo program for partial access data is more practical for game software, even if the demo program and the actual program have common sections. In other words, the demo program, a part of which is designed to be the same as a part of the actual program, is stored in the data memory device separately from the actual program.

In the above-described example, the center 3 is provided with the broadcast satellite reception system 19. However, this system can be omitted. The karaoke system 1 may be for providing only karaoke performance. In this case, a user need not operate the mode key 43b for selecting the operation mode. When the terminal is turned on, the terminal is automatically set in the karaoke mode. Accordingly, when the terminal is turned on and therefore a mode response signal is timely transmitted from the terminal to the center after the transmission of the mode polling signal to the terminal, the center determines that the terminal is in the karaoke mode.

In the above-described explanation, the center 3 is provided with the payment information memory 9 and the bill printer 10 to settle a bill. Alternatively, the center 3 may be connected to a credit company so that the credit company settles the bill. In this case, the memory 9 and the printer 10 may be omitted. The center 3 may be provided with a transmission modem for transmitting information to designate the customer that has agreed the payment and information on the customer's account data.

As described above, in a data transmission system according to the present invention, when desiring to obtain at a terminal device information data from a central device, by requesting partial access data indicating the content of the information data, a user can determine whether the selected information data is what the user desires. When a user does not like the selected information data, the user can request partial access data of other information data. When the user determines that he/she likes the information data based on the partial access data, the user can request total access to all the information data of a predetermined data unit. Thus, when desiring to obtain information data including image information, sound information, or both from a central control unit, a user can select information data which more closely meets his/her requirements, thereby preventing unnecessary selections.

A predetermined payment process can be performed when total access of the selected data is requested. For example, partial access is free, but total access must be paid for. Therefore a user can select total access after sufficiently confirming the contents of the information data, thereby solving the problem of the sense of economic loss when undesired information data is selected.

What is claimed is:

1. A data transmission device for transmitting a desired information via a transmission line from a central control unit to a plurality of terminals, the data transmission device comprising:
   a central control unit including data memory means for storing information data, including image information, sound information, or both, in separate plural data units and in separate plural partial access data, at least a part of each partial access data being the same as a part of a corresponding data unit so as to indicate the content of the information data of the corresponding data unit; and
   a plurality of terminals connected to said central control unit via a transmission line so that the information data can be transmitted from the central control unit to the plurality of terminals, each of the plurality of terminals including:
   data selection means for selecting a desired information data of at least one data unit out of the information data stored in the memory means in the central control unit;
   partial access request means for requesting partial access of the information data selected by the data selection means;
   total access request means for requesting total access of the information data selected by the data selection means; and
   output means for, based on the information data transmitted from the central control unit, reproducing and outputting image information, sound information, or both from the partial access data in response to the partial access request performed by the partial access request means and from the entire part of the data unit in response to the total access request performed by the total access request means, wherein each partial access data is included in a corresponding data unit as a predetermined portion of the corresponding data unit that indicates the content of the information data of the corresponding data unit.

2. A data transmission device of claim 1, wherein the plurality of data units represent informations on a plurality of game programs, the entire data of each data unit representing an entire part of a corresponding game program, each partial access data representing a demo program for a game program represented by the corresponding data unit, the demo program and the corresponding game program having common sections.

3. A data transmission device of claim 1,
   wherein the partial access request means includes partial access request transmitting means for transmitting, to the central control unit, a partial access request signal requesting the partial access of the data unit selected by the data selection means,
   wherein the total access request means includes total access request transmitting means for transmitting, to the central control unit, a total access request signal requesting the total access of the data unit selected by the data selection means,
   wherein the central control unit includes:
   partial access request signal receiving means for receiving the partial access request signal from the terminal, for extracting the partial access data of the selected data unit from the data memory means, and for transmitting the partial access data to the terminal; and
   total access request signal receiving means for receiving the total access request signal from the terminal, for extracting the entire data of the selected data unit from the data memory means, and for transmitting the entire data unit to the terminal, and
   wherein each terminal further includes output control means for controlling the output means to reproduce and output image information, sound information, or both from one of the partial access data and the entire data unit transmitted from the central control unit.

4. A data transmission device of claim 1,
   wherein each terminal further includes request signal transmission means for transmitting a signal requesting transmission of the entire data unit selected by the data selecting means to the terminal when the data selecting means selects the data unit,
   wherein the central control unit includes request signal receiving means for receiving the request signal from the terminal, for extracting the entire data of the selected data unit from the data memory means, and for transmitting the entire data unit to the terminal,
   wherein each terminal includes temporary memory means for temporarily storing the data unit transmitted from the central control unit, and
   wherein the output means includes:
   partial access output means for reproducing only the partial access data out of the data unit stored in the temporary memory means, in response to the partial access request made by the partial access request means; and
   total access output means for reproducing the entire part of the data unit stored in the temporary memory means, in response to the total access request made by the total access request means.

5. A data transmission device of claim 1, wherein the central control unit further includes payment information processing means for performing a predetermined payment information process when the total access request means requests total access of the selected information data.

6. A data transmission device for transmitting information via a transmission line from a central control unit to a plurality of terminals, the data transmission device comprising:

a central control unit; and a plurality of terminals connected to the central control unit via a transmission line, wherein said central control unit includes data memory means for storing a plurality of information data units representative of a plurality of informations, each of the information data units having a partial data representing a predetermined part of the corresponding information which indicates the content of the information, wherein each of the plurality of terminals includes:

data selection means for selecting at least one information data unit representative of an information desired to be obtained, out of the plurality of information data units stored in the data memory means in the central control unit;

access type input means for inputting a desired access type out of a partial access for requesting transmission of the partial data out of the information data unit selected by the data selection means and a total access for requesting transmission of the entire data of the information data unit selected by the data selection means;

access request means for transmitting to the central control unit a partial access request signal requesting transmission of the partial data of the selected information data unit when the partial access is inputted by the access type input means and for transmitting to the central control unit a total access request signal requesting transmission of the entire data of the selected information data unit when the total access is inputted by the access type input means; and information output means for receiving the partial data transmitted from the central control unit in response to the partial access request signal and outputting the part of the desired information, and for receiving the entire data unit transmitted from the central control unit in response to the total access request signal and outputting the entire part of the desired information.

7. A data transmission device of claim 6, wherein the central control unit further includes:

partial access request signal receiving means for receiving the partial access request signal from the terminal, for extracting the partial data of the selected information data unit from the data memory means, and for transmitting the partial data to the terminal; and total access request signal receiving means for receiving the total access request signal from the terminal, for extracting the entire data of the selected information data unit from the data memory means, and for transmitting the entire data unit to the terminal.

8. A data transmission device of claim 7, wherein the plurality of information data units represent informations on a plurality of karaoke songs, the entire data of each information data unit representing an entire part of the corresponding karaoke song, the partial data in each information data unit representing a climactic part of the corresponding karaoke song, wherein the data selecting means selects at least one information data unit representative of at least one karaoke song desired to be sung, and wherein the output means of each terminal includes accompaniment playing means for playing accompaniment sound of the climactic part of the selected karaoke song represented by the partial data transmitted from the central control unit and for playing accompaniment sound of the entire part of the selected karaoke song represented by the entire data unit transmitted from the central control unit.

9. A data transmission device of claim 8, wherein the central control unit further includes a payment information processing unit for performing a predetermined payment information process when the access type input means inputs total access of the selected information data unit.

10. A data transmission device of claim 6, wherein said central control unit includes mode sense polling signal transmission means for transmitting a mode sense polling signal, via the transmission line, to each of the plurality of terminals for confirming an operation mode of each terminal;

wherein each of said plurality of terminals includes mode response signal transmission means for transmitting, in response to the mode sense polling signal, a mode response signal indicating a present operation mode of the each terminal to said central control unit via the transmission line, wherein said central control unit further includes:

determination means for determining the operation mode of each terminal, based on the mode response signal transmitted from each terminal; and request polling signal transmission means for selectively transmitting a request polling signal to a terminal that is determined by the determination means to be in the predetermined operation mode for detecting whether the terminal requests transmission of desired information, wherein the access request means in each of said plurality of terminals includes request response signal transmission means for transmitting a request response signal indicating whether or not the terminal requests the transmission of information when the terminal receives the request polling signal transmitted from central control unit, the request response signal indicating that the terminal requests the transmission of information being added with data indicating the result selected by the data selection means and the desired access type inputted by the access type input means, and wherein said central control unit further includes information transmission means for selectively transmitting the selected information data unit to a terminal that has transmitted the request response signal indicating that the terminal requests the transmission of the selected information and requests the total access and for transmitting partial data of the selected information data unit to a terminal that has transmitted the request response signal indicating that the terminal requests the transmission of the selected information and the partial access.

11. A data transmission device for transmitting information via a transmission line from a central control unit to a plurality of terminals, the data transmission device comprising:

a central control unit; and a plurality of terminals connected to the central control unit via a transmission line, wherein said central control unit includes data memory means for storing a plurality of information data units representative of a plurality of informations, each of the information data units having a partial data representing a predetermined part of the corresponding information which indicates the content of the information, wherein each of the plurality of terminals includes:

data selection means for selecting at least one information data unit representative of an information desired to be obtained, out of the plurality of information data units stored in the data memory means in the central control unit;

request means for transmitting to the central control unit a request signal requesting transmission of an entire data of the selected information data unit from the central control unit when the data selecting means selects the information data unit;

temporary memory means for temporarily storing the entire data of the selected information data unit transmitted from the central control unit;

access type input means for inputting a desired access type out of a partial access for requesting output of the partial data out of the selected information data unit and a total access for requesting output of the entire data of the selected information data unit; and information output means for extracting the partial data from the data unit stored in the temporary memory means, in response to the partial access inputted by the access type input means, and outputting the part of the desired information, and for extracting the entire data of the data unit stored in the temporary memory means, in response to the total access inputted by the access type input means, and outputting the entire part of the desired information.

12. A data transmission device of claim 11, wherein the central control unit further includes request signal receiving means for receiving the request signal from the terminal, for extracting the entire data of the selected information data unit from the data memory means, and for transmitting the entire information data unit to the terminal.

13. A data transmission device of claim 12, wherein the central control unit further includes payment information processing means for performing a predetermined payment information process when the access type input means requests total access of the selected information data unit.

14. A data transmission device of claim 13, wherein the plurality of information data units represent informations on a plurality of movies, the entire data of each information data unit representing an entire part of the corresponding movie, the partial data in each information data unit representing a climactic part of the corresponding movie, wherein the data selecting means selects at least one information data unit representative of at least one movie desired to be reproduced, and wherein the output means of each terminal includes movie reproducing means for reproducing the climactic part of the selected movie represented by the partial data stored in the temporary memory means and for reproducing the entire part of the selected movie represented by the entire information data unit stored in the temporary memory means.

15. A data transmission device of claim 11, wherein said central control unit includes mode sense polling signal transmission means for transmitting a mode sense polling signal, via the transmission line, to each of the plurality of terminals for confirming an operation mode of each terminal;

wherein each of said plurality of terminals includes mode response signal transmission means for transmitting, in response to the mode sense polling signal, a mode response signal indicating a present operation mode of the each terminal to said central control unit via the transmission line, wherein said central control unit further includes:

determination means for determining the operation mode of each terminal, based on the mode response signal transmitted from each terminal; and request polling signal transmission means for selectively transmitting a request polling signal to a terminal that is determined by the determination means to be in the predetermined operation mode for detecting whether the terminal requests transmission of desired information data unit, wherein the request means in each of said plurality of terminals includes request response signal transmission means for transmitting a request response signal indicating whether or not the terminal requests the transmission of information when the terminal receives the request polling signal transmitted from central control unit, the request response signal indicating that the terminal requests the transmission of the desired information data unit being added with data indicating the result selected by the data selection means, and wherein the request signal receiving means in said central control unit includes information transmission means for selectively transmitting the information data unit to a terminal that has transmitted the request response signal indicating that the terminal requests the transmission of the selected information data unit.

* * * * *